(12) United States Patent
Baskar et al.

(10) Patent No.: US 8,955,900 B2
(45) Date of Patent: Feb. 17, 2015

(54) SIDE-IMPACT ENERGY ABSORPTION BRACKET

(71) Applicant: GM Global Technology Operations LLC, Detroit, MI (US)

(72) Inventors: Shunmugam Baskar, West Bloomfield, MI (US); Salman A. Khan, West Bloomfield, MI (US); Stephen D. Rusnak, Waterford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/871,108

(22) Filed: Apr. 26, 2013

(65) Prior Publication Data

US 2014/0319869 A1 Oct. 30, 2014

(51) Int. Cl.
*B60J 5/04* (2006.01)

(52) U.S. Cl.
CPC .................................... *B60J 5/0423* (2013.01)
USPC .................................. 296/146.6; 296/187.12

(58) Field of Classification Search
USPC ................. 296/30, 146.5, 146.6, 187.12, 202
See application file for complete search history.

(56) References Cited

U.S. PATENT DOCUMENTS

| 5,404,690 | A  | * | 4/1995  | Hanf ............................ 296/146.6 |
| 6,460,648 | B2 | * | 10/2002 | Kleinberg ...................... 180/282 |
| 6,575,525 | B2 | * | 6/2003  | Traister et al. ............ 296/187.12 |
| 7,837,255 | B1 | * | 11/2010 | Okutsu et al. ............. 296/187.12 |
| 7,857,375 | B2 | * | 12/2010 | Huttsell et al. .............. 296/146.6 |
| 2007/0145771 | A1 | * | 6/2007  | Tanaka et al. .............. 296/146.6 |
| 2007/0228769 | A1 | * | 10/2007 | Dandekar et al. .......... 296/146.6 |
| 2010/0148535 | A1 | * | 6/2010  | Takahashi et al. ........ 296/187.12 |
| 2010/0154314 | A1 | * | 6/2010  | Holmes .......................... 49/502 |
| 2011/0169302 | A1 | * | 7/2011  | Deng et al. ............... 296/187.12 |

* cited by examiner

*Primary Examiner* — Glenn Dayoan
*Assistant Examiner* — Jason S Daniels
(74) *Attorney, Agent, or Firm* — Quinn Law Group, PLLC

(57) ABSTRACT

A door for selectively opening and closing at least a portion of an opening in a vehicle includes an outer door panel and an inner door panel. The inner panel is attached to the outer panel thus defining a space between the inner and outer panels. The inner panel is characterized by height and length. A reinforcement beam having a length substantially equal to the length of the inner panel is attached to the inner panel such that the beam is disposed in the defined space. A reinforcement bracket having a height and a length is attached to the inner panel intermediate the first and second ends of the length of the inner panel such that the beam is disposed in the space between the inner and outer panels. The length of the bracket is smaller than the length of the reinforcement beam.

14 Claims, 3 Drawing Sheets

SIDE-IMPACT ENERGY ABSORPTION BRACKET

TECHNICAL FIELD

The invention relates to a side-impact energy absorption bracket for a vehicle door.

BACKGROUND

A door is a movable structure used to open and close off an entrance, typically consisting of a panel that swings on hinges or that slides or rotates inside a space. When open, doors admit ventilation and light. A door may be used to control physical atmosphere within a space so that an interior may be more effectively heated or cooled. A door may also be significant in preventing the spread of fire. Doors also act as a barrier to noise, inclement weather, and physical intrusion into a specifically defined space.

In contemporary motor vehicles, besides carrying the above-mentioned functions, doors are frequently reinforced to reduce the degree of damage to the door structure in cases of impact between the vehicle and another object. Such reinforcements may be designed to allow the door to withstand some level of impact from another object without permitting intrusion into the vehicle's passenger compartment or sustaining extensive damage to the vehicle's safety systems. Additionally, such reinforcements may be tied to the door structure to allow the door to absorb a portion of impact energy and, for occupant protection, route the energy away from the vehicle's passenger compartment.

SUMMARY

A door for selectively opening and closing at least a portion of an opening in a vehicle includes an outer door panel and an inner door panel. The inner door panel is attached to the outer door panel such that a space is defined between the inner door panel and the outer door panel. The inner door panel is characterized by a height and a length, wherein the length includes a first end and a second end. A reinforcement beam having a length substantially equal to the length of the inner door panel is attached to the inner door panel such that the beam is disposed in the space defined between the inner and outer door panels for impact absorption. A reinforcement bracket having a height and a length is attached to the inner door panel intermediate the first and second ends of the length of the inner door panel such that the beam is disposed in the space between the inner and outer door panels. The reinforcement bracket is configured to absorb impact energy that is directed into the space between the inner and outer door panels. The length of the bracket is smaller than the length of the reinforcement beam.

The inner door panel may include a bend disposed substantially along the length of the inner door panel. The bracket may span the bend for at least a portion of the length of the inner door panel to thereby reinforce the bend.

The bracket may have a cross-section that is characterized by a general Z-shape. Additionally, the bracket may be attached to the inner door panel at the two distal portions of the general Z-shape.

The bracket may be attached to the inner door panel by a process of welding.

The general Z-shape may include at least two bends. The bracket may include a rib extending along the height of the bracket and spanning at least one of the at least two bends.

The bracket may additionally include an unattached or free curved portion extending from one of the two distal portions of the Z-shape substantially toward the outer door panel.

The bracket may include a turned edge along the height of the bracket. The turned edge may be directed substantially toward the inner door panel.

The bracket may be constructed from a monolithic piece of steel.

The height of the inner door panel may be characterized by a first end and a second end. The beam may be attached to the inner door panel intermediate the first and second ends of the height of the inner door panel. Furthermore the bracket may be disposed between the beam and the first end of the height of the inner door panel.

A vehicle employing the door as described above is also disclosed.

The above features and advantages, and other features and advantages of the present disclosure, will be readily apparent from the following detailed description of the embodiment(s) and best mode(s) for carrying out the described invention when taken in connection with the accompanying drawings and appended claims.

DETAILED DESCRIPTION

Figure 1:
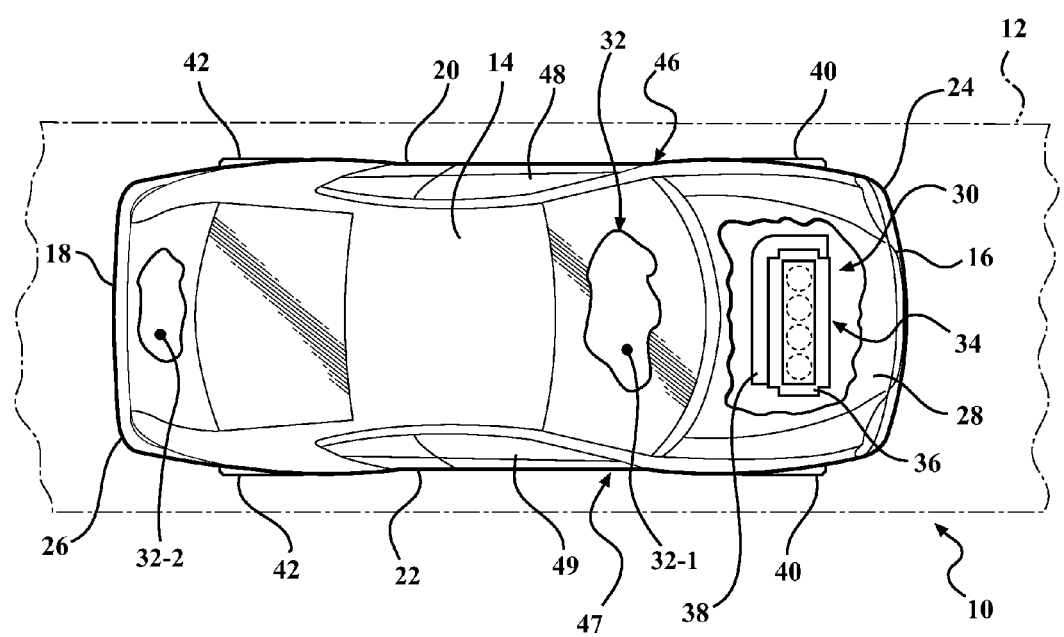
FIG. 1 is a schematic top view of a vehicle including side doors with an impact absorption and reinforcement structure.

Referring to the drawings, wherein like reference numbers refer to like components, FIG. 1 shows a schematic view of a motor vehicle 10 positioned relative to a road surface 12. The vehicle 10 includes a vehicle body 14. The vehicle body 14 defines four body sides. The four body sides include a first or front end 16, a second or rear end 18, a left side 20, and a right side 22. As shown, the front end 16 may include a front bumper assembly 24, while the rear end 18 may include a rear bumper assembly 26. The vehicle body 14 also includes a hood 28 configured to cover at least a portion of the front end 16 to thereby define an under-hood compartment 30. The vehicle body 14 also defines an interior portion 32 of the vehicle 10 that may include a passenger compartment 32-1 positioned between the under-hood compartment 30 and the rear end 18 and a cargo area 32-2.

The under-hood compartment 30 houses a powertrain 34 that is configured to propel the vehicle 10. As shown in FIG. 1, the powertrain 34 may include an internal combustion (IC) engine 36 and a transmission 38. The powertrain 34 may also include one or more motor/generators as well as a fuel cell, neither of which are shown, but a powertrain configuration employing such devices is appreciated by those skilled in the art. The vehicle 10 also includes front wheels 40 and rear wheels 42. Depending on specific configuration of the powertrain 34, power of the engine 36 may be transmitted to the road surface 12 through the front wheels 40, the rear wheels 42, or through all the wheels 40 and 42 using a suspension system (not shown).

As may be additionally seen in FIG. 1, the vehicle body 14 also defines openings 46, 47, respectively, at the left and right body sides 20, 22. As shown, each of the left and right body sides 20 and 22 includes a door. Such doors are configured to selectively open and close at least a portion of the openings 46, 47, respectively, in order to provide passenger ingress/egress to/from the passenger compartment 32-1. Specifically, the left side 20 includes a door 48, while the right side includes a door 49. Although a single door is shown on each of the body sides 20 and 22, fewer or great number of doors may be provided on each side. Furthermore, such door(s) may also be provided at the rear end 18, as, for example, in a cargo-carrying vehicle like a van, for gaining access to the cargo area 32-2.

Figure 2:
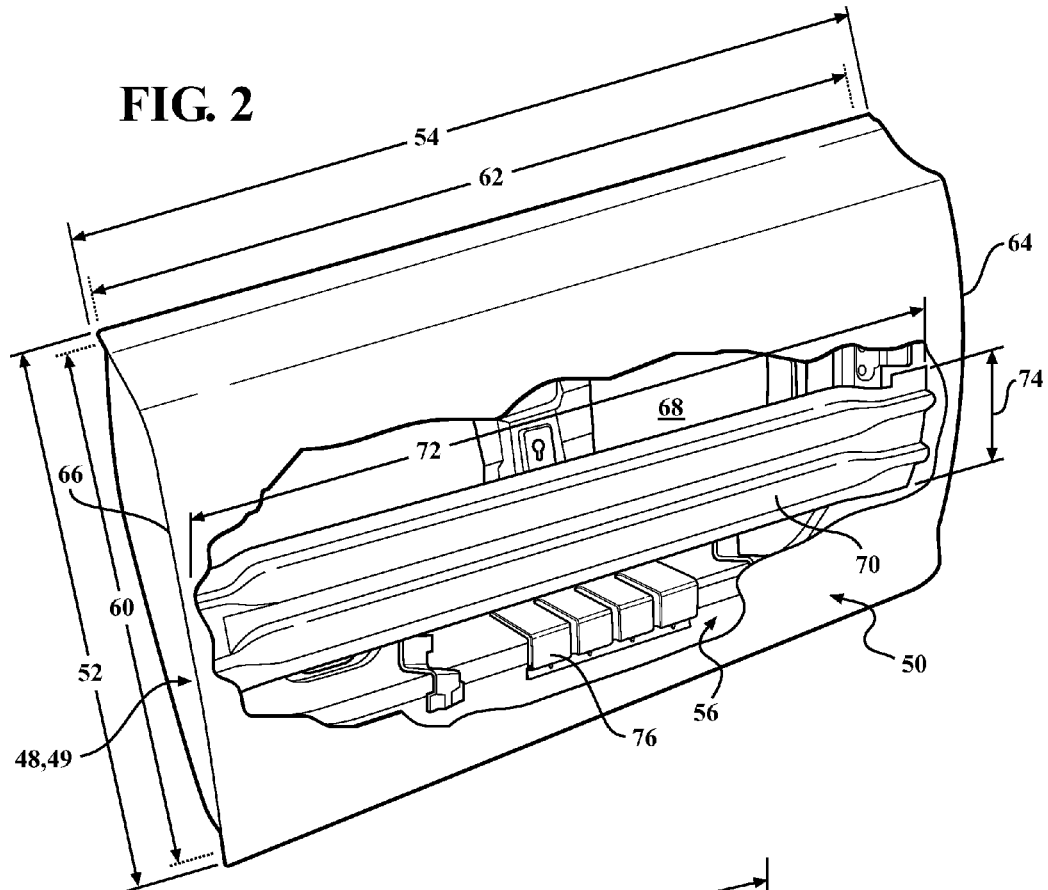
FIG. 2 is a schematic close-up perspective partial breakaway view of one of the doors shown in FIG. 1.

As shown in FIG. 2, each door 48, 49 includes an outer door panel 50 that is characterized by height 52 and length 54. Each door 48, 49 also includes an inner door panel 56 that is attached to the outer door panel 50. While the outer door panel 50 provides part of the exterior of the vehicle body 14, the inner door panel 56 provides a surface for mounting various trim pieces that are part of the interior of passenger compartment 32-1. The inner door panel 56 is characterized by height 60 and length 62. The height 60 and length 62 of the inner door panel 56 are substantially coextensive with the height 52 and length 54, respectively, of the outer door panel 50, i.e., the respective inner and outer door panel lengths and widths are generally equivalent. The length 62 includes a first end 64 and a second end 66, which provide regions for attachment of the inner door panel 56 to the outer door panel 50. The attachment of the inner door panel 56 to the outer door panel 50 may be affected by such methods as fastening or welding. Upon attachment of the inner door panel 56 to the outer door panel 50, a space 68 is defined between the inner door panel and the outer door panel.

Figure 4:
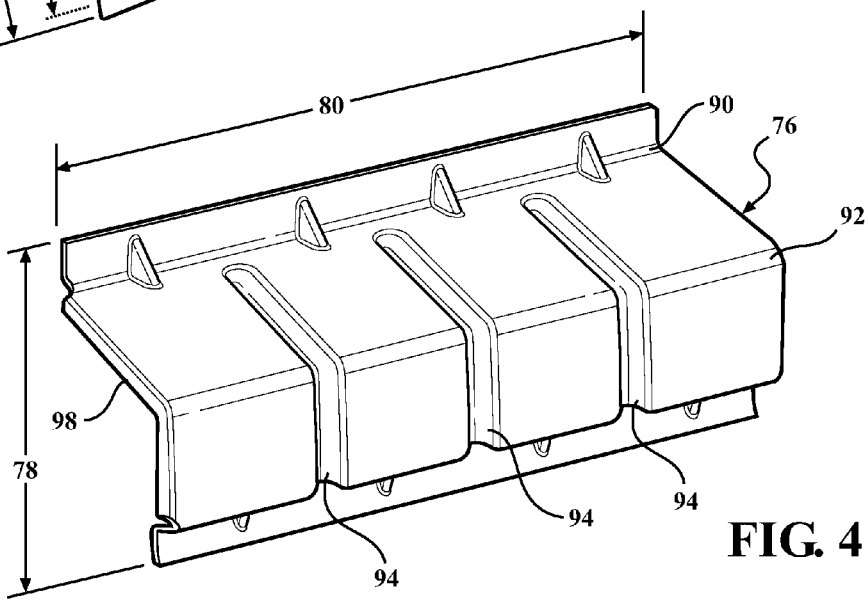
FIG. 4 is a schematic perspective view of the bracket shown in FIGS. 2-3.

Each door 48, 49 also includes a reinforcement beam 70 having a length 72 and a height 74. The length 72 is substantially equal to the length 62 of the inner door panel 56, i.e., the length of the beam 70 is generally, but necessarily fully, coextensive with the length of the inner door panel. The beam 70 is attached to the inner door panel 56 such that the beam is disposed in the space 68. The beam 70 may be constructed from steel and welded to the inner door panel 56 at the beam's two opposing ends. The beam 70 is configured to provide absorption of energy from a side impact 75 on the vehicle 10 at the door 48 or 49 (shown in FIG. 3). As may be seen in FIG. 2, a reinforcement bracket 76 is attached to the inner door panel 56 intermediate the first and second ends 64, 66 of the inner door panel length 62. Similar to the beam 70, bracket 76 may be constructed from steel. Furthermore, the bracket 76 may be attached to the inner door panel 56 by welds 77 (shown in FIG. 3), which may be weld beads or weld spots. As may be seen in FIG. 2, similar to the beam 70, the bracket 76 is disposed in the space 68 between the outer and inner door panels 50, 56. The bracket 76 is configured to absorb impact energy that is directed into the space between the outer and inner door panels 50, 56 intermediate the first and second ends 64, 66 of the inner door panel length 62. As may be seen in FIG. 4, the bracket 76 is characterized by height 78 and length 80, wherein the length of the bracket is smaller than the length 72 of the reinforcement beam 70.

Referring back to FIG. 3, the inner door panel 56 defines a bend 82 disposed substantially along the length 62, while the bend 82 may be generally coextensive with the length 62. The bracket 76 spans the bend 82 for at least a portion of the length 62 of the inner door panel 56 to thereby reinforce the bend. The bracket 76 includes a cross-section that is characterized by a general Z-shape 84 that has a height 78 and a width 80 (shown in FIG. 4). With resumed reference to FIG. 3, the bracket 76 is attached to the inner door panel 56 at the two distal portions 76-1 and 76-2 of the Z-shape 84. As also shown, the Z-shape 84 includes at least two bends—a first bend 90 and a second bend 92. A plurality of ribs 94 extends along the height 88, spanning the bends 90 and 92. The Z-shape 84 additionally includes an unattached curved portion 96 extending from the distal portion 76-2 of the Z-shape 84 into the space 68 and substantially toward the outer door panel 50, i.e., generally in the direction of the outer door panel. The bracket 76 includes a turned edge 98 (shown in FIG. 4) along the height 78. The turned edge 98 is directed substantially toward the inner door panel 56, i.e., generally in the direction of the inner door panel, when the bracket 76 is attached to the door 48, 49.

Figure 3:
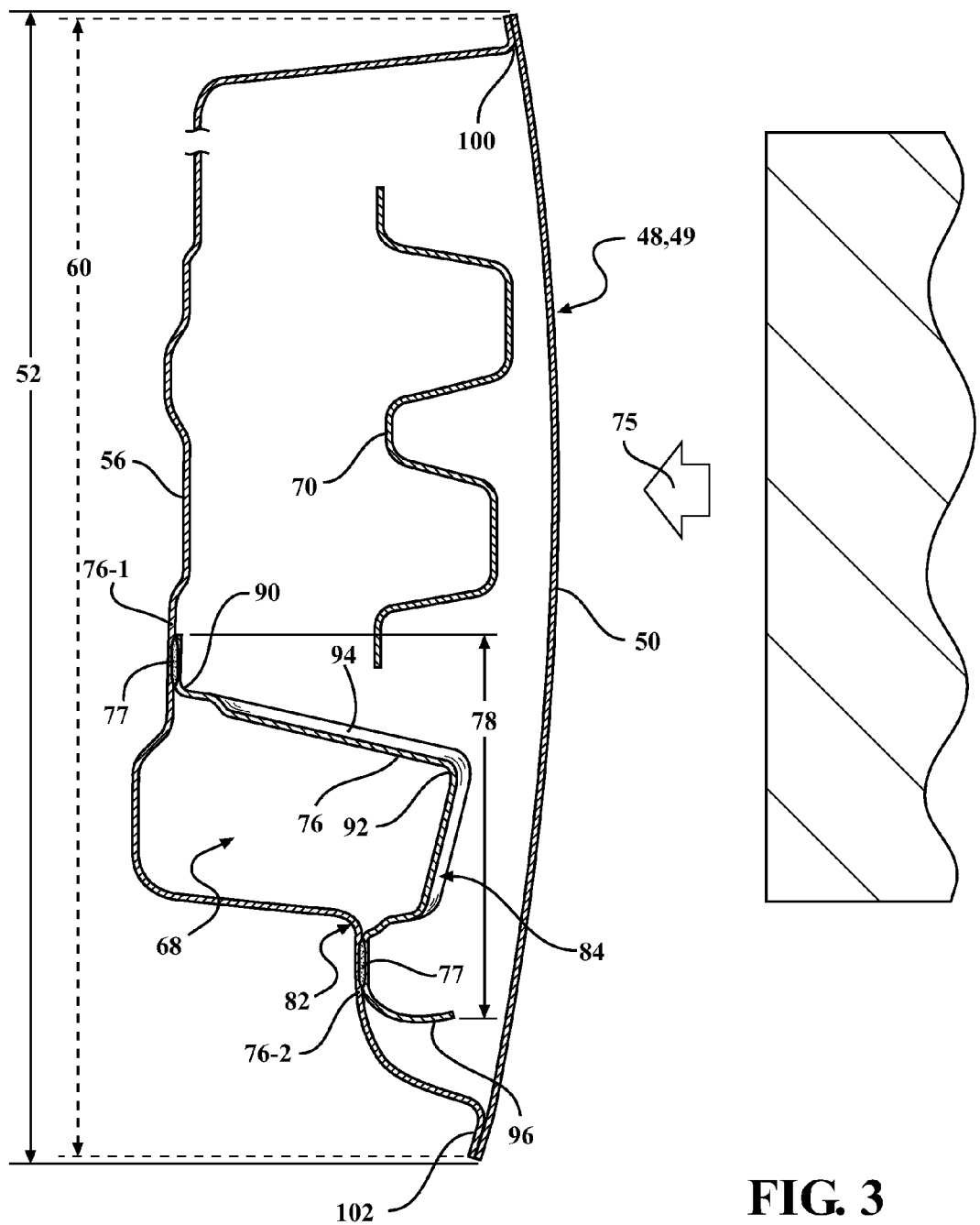
FIG. 3 is a schematic partial cross-sectional side view of the door shown in FIG. 2, depicting a reinforcement beam and bracket of the impact absorption and reinforcement structure counteracting a side impact.

With renewed reference to FIG. 3, the height 60 of the inner door panel 56 may be characterized by a first end 100 and a second end 102. The beam 70 is attached to the inner door panel 56 intermediate the first and second ends 100, 102 of the height 60. The bracket 76 is disposed in the space 68 between the beam 70 and the first end 100 of the height 60, thus reinforcing the door 48 or 49 in the space 68 against the side impact 75 that may otherwise intrude into the passenger compartment 32-1. While the bracket 76 does not span the entire length of the inner door panel 56, the bracket is positioned and secured sufficiently to form with the beam 70 a structure capable of absorbing impact energy. Accordingly, the beam 70 and the bracket 76 together provide an impact absorption and reinforcement structure specifically configured to counteract the energy of the side impact 75.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A vehicle comprising:
   a vehicle body defining an opening; and
   a door configured to selectively open and close at least a portion of the opening, the door having:
      an outer door panel;
      an inner door panel attached to the outer door panel and characterized by a height and a length, wherein the length includes a first end and a second end, and wherein a space is defined between the inner door panel and the outer door panel;
      a reinforcement beam, having a length substantially equal to the length of the inner door panel, attached to the inner door panel such that the beam is disposed in the space between the inner and outer door panels; and
      a reinforcement bracket, having a height and a length, attached to the inner door panel intermediate the first and second ends of the length of the inner door panel such that the bracket is disposed in the space between the inner and outer door panels, wherein the length of the bracket is smaller than the length of the reinforcement beam
      wherein:
         in a cross-sectional view, the bracket is characterized by a general Z-shape having at least two bends;
         the bracket includes a turned edge along the height of the bracket spanning one of the at least two bends, such that the turned edge is directed substantially toward the inner door panel, and also includes a curved portion extending from one of two distal portions of the Z-shape substantially toward the outer door panel, but unattached thereto; and the beam and the bracket together provide an energy absorption and reinforcement structure for the door.

2. The vehicle of claim 1, wherein the inner door panel includes a bend disposed substantially along the length of the inner door panel and the bracket spans the bend for at least a portion of the length of the inner door panel to thereby reinforce the bend.

3. The vehicle of claim 1, wherein the bracket is attached to the inner door panel at the two distal portions of the general Z-shape.

4. The vehicle of claim 3, wherein the bracket is attached to the inner door panel by a weld.

5. The vehicle of claim 3, wherein the bracket includes a rib extending along the height of the bracket and spanning at least one of the at least two bends to facilitate the energy absorption and reinforcement structure for the door.

6. The vehicle of claim 1, wherein the bracket is constructed from steel.

7. The vehicle of claim 1, wherein:
the height of the inner door panel is characterized by a first end and a second end;
the beam is attached to the inner door panel intermediate the first and second ends of the height of the inner door panel; and
the bracket is disposed between the beam and the first end of the height of the inner door panel.

8. A door for selectively opening and closing at least a portion of an opening in a vehicle, the door comprising:
an outer door panel;
an inner door panel attached to the outer door panel and characterized by a height and a length, wherein the length includes a first end and a second end, and wherein a space is defined between the inner door panel and the outer door panel;
a reinforcement beam, having a length substantially equal to the length of the inner door panel, attached to the inner door panel such that the beam is disposed in the space between the inner and outer door panels; and
a reinforcement bracket, having a height and a length, attached to the inner door panel intermediate the first and second ends of the length of the inner door panel such that the bracket is disposed in the space between the inner and outer door panels, wherein the length of the bracket is smaller than the length of the reinforcement beam wherein:
in a cross-sectional view, the bracket is characterized by a general Z-shape having at least two bends;
the bracket includes a turned edge along the height of the bracket spanning one of the at least two bends, such that the turned edge is directed substantially toward the inner door panel, and also includes a curved portion extending from one of two distal portions of the Z-shape substantially toward the outer door panel, but unattached thereto; and
the beam and the bracket together provide an energy absorption and reinforcement structure for the door.

9. The vehicle door of claim 8, wherein the inner door panel includes a bend disposed substantially along the length of the inner door panel, and wherein the bracket spans the bend for at least a portion of the length of the inner door panel to thereby reinforce the bend.

10. The vehicle door of claim 8, wherein the bracket is attached to the inner door panel at the two distal portions of the general Z-shape.

11. The vehicle door of claim 10, wherein the bracket is attached to the inner door panel by a weld.

12. The vehicle door of claim 10, wherein the bracket includes a rib extending along the height of the bracket and spanning at least one of the at least two bends to facilitate the energy absorption and reinforcement structure for the door.

13. The vehicle door of claim 8, wherein the bracket is constructed from steel.

14. The vehicle door of claim 8, wherein:
the height of the inner door panel is characterized by a first end and a second end;
the beam is attached to the inner door panel intermediate the first and second ends of the height of the inner door panel; and
the bracket is disposed between the beam and the first end of the height of the inner door panel.

* * * * *